US012729258B2

(12) United States Patent
Ju et al.

(10) Patent No.: US 12,729,258 B2
(45) **Date of Patent: *Sep. 8, 2026**

(54) METHOD FOR PRODUCING COPOLYMER, COPOLYMER PRODUCED THEREFROM, AND THERMOPLASTIC RESIN COMPOSITION INCLUDING THE SAME

(71) Applicant: LG CHEM, LTD., Seoul (KR)

(72) Inventors: Min Cheol Ju, Daejeon (KR); Min Seung Shin, Daejeon (KR); Sung Won Hong, Daejeon (KR); In Soo Kim, Daejeon (KR); Hyung Sub Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 993 days.

This patent is subject to a terminal disclaimer.

(21) Appl. No.: 17/607,295

(22) PCT Filed: Oct. 27, 2020

(86) PCT No.: PCT/KR2020/014700

§ 371 (c)(1),
(2) Date: Oct. 28, 2021

(87) PCT Pub. No.: WO2021/101101

PCT Pub. Date: May 27, 2021

(65) Prior Publication Data

US 2022/0235158 A1 Jul. 28, 2022

(30) Foreign Application Priority Data

Nov. 21, 2019 (KR) ........................ 10-2019-0150368

(51) Int. Cl.
*C08F 212/10* (2006.01)

(52) U.S. Cl.
CPC ................................. *C08F 212/10* (2013.01)

(58) Field of Classification Search
CPC ........ C08F 212/10; C08F 2/30; C08F 212/12; C08F 2/001; C08F 220/44; C08L 25/16
See application file for complete search history.

(56) References Cited

U.S. PATENT DOCUMENTS 3,931,128 A * 1/1976 Takizawa ............. C08F 220/44 526/342
4,439,495 A * 3/1984 Tobias .............. C09D 151/003 524/514
4,713,429 A 12/1987 Kuma
5,171,814 A 12/1992 Mathumoto et al.
2003/0032747 A1* 2/2003 Lee ......................... C08L 55/02 526/341
2015/0376316 A1 12/2015 Heo et al.
2016/0264703 A1* 9/2016 Jung ....................... C08L 25/16
2017/0260303 A1* 9/2017 Chung ...................... C08F 2/22
2021/0403621 A1* 12/2021 Kim ...................... C08F 220/00
2022/0380507 A1* 12/2022 Jeon ...................... C08F 279/04

FOREIGN PATENT DOCUMENTS

CN 103030741 A * 4/2013
CN 107001544 A 8/2017
CN 110785445 A 2/2020
EP 3597674 A1 1/2020
JP 08301913 A * 11/1996 ............ C08F 212/10
JP 2000264926 A 9/2000
JP 3241815 B2 12/2001
KR 10-0191420 B 6/1999
KR 10-0193022 B1 6/1999
KR 10-0401312 B1 10/2003
KR 20090033988 A 4/2009
KR 10-1055000 B1 8/2011
KR 10-20150037473 A 4/2015
KR 20160074729 A 6/2016
KR 10-1739621 B1 6/2017
KR 10-1785531 B1 11/2017

OTHER PUBLICATIONS

CN 103030741 translation (Year: 2011).*
Extended European Search Report for related EP Application No. 208912360.0, mailed May 20, 2022.

* cited by examiner

*Primary Examiner* — Katarzyna I Kolb

(74) *Attorney, Agent, or Firm* — ROTHWELL, FIGG, ERNST & MANBECK, P.C.

(57) ABSTRACT

The present invention relates to a method for producing a copolymer, a copolymer produced therefrom, and a thermoplastic resin composition including the same, the method including step (S10) for adding aromatic vinyl-based monomers and vinyl cyan-based monomers to perform polymerization in the presence of polymerization initiators, wherein the polymerization initiators includes at least two different kinds of polymerization initiators, and part or all of the aromatic vinyl-based monomers are continuously divisionally added during the polymerization in step (S10).

6 Claims, No Drawings

METHOD FOR PRODUCING COPOLYMER, COPOLYMER PRODUCED THEREFROM, AND THERMOPLASTIC RESIN COMPOSITION INCLUDING THE SAME

CROSS-REFERENCE TO RELATED APPLICATIONS

The present invention is a National Phase of International Application No. PCT/KR2020/014700, which claims the benefit of the priority of Korean Patent Application No. 10-2019-0150368, filed on Nov. 21, 2019, the disclosures of which are incorporated herein in their entirety by reference.

TECHNICAL FIELD

The present invention relates to a method for producing a copolymer, and more specifically, to a method for producing a copolymer using an aromatic vinyl-based monomer and a vinyl cyan-based monomer, a copolymer produced therefrom, and a thermoplastic resin composition including the same.

BACKGROUND ART

Generally, styrene-based copolymers have been widely used in a variety of industrial fields including office automation equipment such as computers, printers, and copying machines, home appliances such as televisions and stereo equipment, electric and electronic parts, automobile parts, and other miscellaneous goods due to having excellent moldability, rigidity, and electrical characteristics.

Particularly, heat-resistant styrene-based copolymers and diene-based graft copolymers such as ABS resins have been mixed and used for goods such as the interior or exterior materials of cars which require heat-resistance. Here, the heat-resistant styrene-based copolymers are produced by adding heat-resistant monomers such as maleimide-based monomers or α-methylstyrene monomers, but the maleimide-based monomers have a limitation in that they are expensive and it is difficult to control reactivity during the polymerization reaction, and the α-methylstyrene monomers have excellent processability and good color, but there is a limitation of low reactivity during the polymerization reaction. In addition, when the heat-resistant styrene-based copolymers using heat-resistant monomers such as α-methylstyrene monomers are used by mixing with the diene-based graft copolymers, the heat-resistance is superior to the styrene-based copolymers, but thermal stability at an extrusion processing temperature is poor, thereby generating a gas during the extrusion processing, and thus there is a limitation in that this has a bad influence on workers who carry out the extrusion processing.

Meanwhile, the styrene-based copolymers including the heat-resistant styrene-based copolymers are generally produced by emulsion polymerization, suspension polymerization, or bulk polymerization. When the emulsion polymerization method is used, there is an advantage that the prepared particle size is smaller than that by other polymerization methods and thus the surface area which can participate in the polymerization is widely distributed so that the temperature of reaction system is easily controlled and the polymerization can be performed within a short time, achieving stable polymerization, but unreacted monomers, polymerization additives, etc. remain in the polymer to cause a matter of coloration or discoloration of a copolymer, and since after the polymerization reaction, a setting process should be performed to prepare a slurry, and the post-treatment process, which rinses, dehydrates, and dries the slurry, should be performed, there are limitations of production efficiency reduction, facilities, and wastewater treatment.

On the contrary, when the suspension polymerization method and the bulk polymerization method are used, there are advantages that fewer additives are required during the polymerization compared to the emulsion polymerization, and the post-treatment process is simpler than the emulsion polymerization, and thus the coloration on the final product hardly occurs. However, when the bulk polymerization method is used, the productivity may be superior to other polymerization methods, but there is a limitation to apply the bulk polymerization method to small quantity batch production. On the other hand, for the suspension polymerization, the amount of additives is used a little, the post-treatment process is relatively simple, and the suspension polymerization can be easily applied to small quantity batch production.

The suspension polymerization method generally performs a polymerization reaction by collectively adding water, a dispersant, monomers, and a polymerization initiator, and when monomers, which are partially dissolved in water, are used, the ratio of monomers introduced at the initial stage and the ratio of monomers participating in the initial polymerization become different. For example, when the suspension polymerization is performed by using aromatic vinyl-based monomers and vinyl cyan-based monomers, some of the vinyl cyan-based monomers are dissolved in water and at the beginning of the polymerization reaction, the vinyl cyan-based monomers participating in the polymerization are different from the added ratio. As a result, there may occur limitations in that polymers having non-uniform composition are produced, for example, only vinyl cyan-based monomers are continuously bonded to the end of the polymer chain, so that physical properties of the copolymer are deteriorated and yellowness increases.

Therefore, when heat-resistant styrene-based copolymers are produced by the suspension polymerization method, in order to compensate for the disadvantages of the suspension polymerization method as described above, a method of divisionally adding heat-resistant monomers such as α-methylstyrene monomers during the polymerization after the initiation of the polymerization has been proposed, and thus the non-uniformity of the monomer units in the copolymer has been reduced, but the thermal stability at the extrusion processing temperature is still poor.

Accordingly, there is a need for development on a method for producing a heat-resistant styrene-based copolymer having reduced non-uniformity of monomer units in the copolymer and simultaneously improved thermal stability at an extrusion processing temperature.

PRIOR ART DOCUMENTS

Patent Document (Patent Document 1) JP3241815B2

DISCLOSURE OF THE INVENTION

Technical Problem

An aspect of the present invention provides a method for producing a copolymer having reduced non-uniformity of monomer units in the copolymer and simultaneously having excellent thermal stability.

Technical Solution

According to an aspect of the present invention, there is provided a method for producing a copolymer, the method including step (S10) for adding aromatic vinyl-based monomers and vinyl cyan-based monomers to perform polymerization in the presence of polymerization initiators, wherein the polymerization initiators includes at least two different kinds of polymerization initiators, and part or all of the aromatic vinyl-based monomers are continuously divisionally added during the polymerization in step (S10).

According to another aspect of the present invention, there is provided a copolymer including an aromatic vinyl-based monomer unit and a vinyl cyan-based monomer unit, wherein a heating residue calculated by Equation 1 below is 97.6% or more.

Heating residue (%)=(weight of copolymer after staying in oven/weight of copolymer before staying in oven)×100 [Equation 1]

wherein, in Equation 1 above, the staying in the oven is performed at 250° C. for 2 hours.

According to another aspect of the present invention, there is provided a thermoplastic resin composition including the copolymer and a thermoplastic resin.

Advantageous Effects

When a copolymer is produced by using a method for producing a copolymer according to the present invention, a styrene-based copolymer having reduced non-uniformity of monomer units in the copolymer may be produced.

In addition, when a copolymer is produced by using a method for producing a copolymer according to the present invention, a heat-resistant styrene-based copolymer having excellent thermal stability may be produced.

Further, the copolymer produced according to the present invention has an effect of preventing gas generation during the extrusion process because the monomer units in the copolymer are uniformly distributed and the thermal stability is excellent.

MODE FOR CARRYING OUT THE INVENTION

Hereinafter, the present invention will be described in more detail to aid in understanding the present invention.

Terms or words used in this specification and claims should not be restrictively interpreted as ordinary meanings or dictionary-based meanings, but should be interpreted as meanings and concepts conforming to the technical spirit of the present invention, based on the principle that an inventor can properly define the concept of a term to explain the invention in the best ways.

Term and measurement method used in the present invention may be defined as follows unless otherwise defined.

The term "composition" as used in the present invention includes a mixture of materials including the corresponding composition as well as a reaction product and a decomposition product formed from the materials of the corresponding composition.

The term "monomer unit" as used in the present invention may mean a repeating unit, and a structure derived therefrom or the material itself, the repeating unit being formed when a compound used as a monomer participating in the polymerization reaction.

The term "derivative" as used in the present invention may refer to a compound having a structure in which at least one hydrogen atom constituting the original compound is substituted with a halogen group, an alkyl group, or a hydroxy group.

The "polymerization conversion ratio" in the present invention refers to a degree in which monomers are polymerized by a polymerization reaction to form a polymer, and it may be calculated by Equation 2 below by taking some polymers in a reactor during the polymerization.

Polymerization conversion ratio (%)=[(total amount of added monomers−total amount of reacted monomers)/total amount of added monomers]×100 [Equation 2]

The present invention provides a method for producing a copolymer having reduced non-uniformity of monomer units in the copolymer and having excellent thermal stability.

The method for producing a copolymer according to the present invention may be a method for producing a styrene-based copolymer, and as a specific example, may be a method for producing a heat-resistant styrene-based copolymer.

A method for producing a copolymer according to the present invention is characterized by including step (S10) for adding aromatic vinyl-based monomers and vinyl cyan-based monomers to perform polymerization in the presence of polymerization initiators, wherein the polymerization initiators includes at least two different kinds of polymerization initiators, and part or all of the aromatic vinyl-based monomers are continuously divisionally added during the polymerization in step (S10).

According to an embodiment of the present invention, the polymerization in step (S10) may be performed by a suspension polymerization method. The suspension polymerization has advantages that a small amount of additives is used, the post-treatment process is relatively simple, and the suspension polymerization is easily applied even to small quantity batch production. The suspension polymerization method is a batch polymerization and performs a polymerization by collectively adding reactants including monomers used for the polymerization into a reactor before the initiation of the polymerization. In this case, the vinyl cyan-based monomers having a little water-solubility are dissolved in a water-soluble solvent, and thus the aromatic vinyl-based monomers and only some vinyl cyan-based monomers participate in the polymerization reaction at the initial stage of the polymerization, and as the polymerization goes to the later stage, only the vinyl cyan-based monomers remain to continue with the polymerization reaction. Therefore, only the vinyl cyan-based monomer units are continuously bonded to the terminus of the copolymer, thus the copolymer having non-uniformly the monomer units which form the copolymer is produced, and thereby there is a limitation in the color, for example, an increase in yellowness.

Thus, when the copolymer is produced by the suspension polymerization method, in order to compensate for the disadvantages of the suspension polymerization method as described above, a method of divisionally adding heat-resistant monomers such as α-methylstyrene monomers during the polymerization after the initiation of the polymerization has been proposed, and thus the non-uniformity of the monomer units in the copolymer has been reduced, but the thermal stability at the extrusion processing temperature is still poor.

However, according to the method for producing a copolymer according to the present invention, when at least two different kinds of polymerization initiators are added as a polymerization initiator, a low-temperature polymerization initiator, which initiates the polymerization at a relatively low temperature, of the at least two kinds of polymerization initiators initiates the polymerization from the initial stage of the polymerization reaction, and even though the low-temperature polymerization initiator falls short in the later stage (e.g., a time point of 50% to 100% of the polymerization conversion ratio) of the polymerization reaction, a high-temperature polymerization initiator, which initiates the polymerization at a relatively high temperature, of the at least two kinds of polymerization initiators compensates for the insufficient low-temperature polymerization initiator, and thus the polymerization reaction can be maintained while the polymerization reaction rate is not reduced in the later stage of the polymerization reaction. When part or all of the aromatic vinyl-based monomers are continuously divisionally added during the polymerization, the content of the aromatic vinyl-based monomers, which can participate in the polymerization reaction in the reaction system, is controlled according to polymerization conversion ratio and polymerization reaction rate, and thus the monomer units in the copolymer can be formed uniformly, and thereby there are effects of reducing the non-uniformity of the monomer units in the produced copolymer and achieving excellent thermal stability.

Meanwhile, unlike the method for producing a copolymer according to the present invention, even though at least two different kinds of polymerization initiators are added as a polymerization initiator, when part or all of the aromatic vinyl-based monomers are collectively added before the initiation of the polymerization, the monomer units in the copolymer are still non-uniform due to the difference of the reactivity between each monomer.

According to an embodiment of the present invention, the polymerization initiator may include at least two kinds selected from the group consisting of 2,5-dimethyl-2,5-di(t-butylperoxy)hexane, di(t-butylperoxy-isopropyl)benzene, t-butyl cumyl peroxide, di-(t-amyl)-peroxide, dicumyl peroxide, butyl 4,4-di(t-butylperoxy)valerate, t-butyl peroxybenzoate, 2,2-di(t-butylperoxy)butane, t-amyl peroxy-benzoate, t-butylperoxy-acetate, t-butylperoxy-(2-ethylhexyl) carbonate, t-butylperoxy isopropyl carbonate, t-butyl peroxy-3,5,5-trimethyl-hexanoate, 1,1-bis(t-butylperoxy) cyclohexane, t-amyl peroxyacetate, t-amylperoxy-(2-ethylhexyl)carbonate, 1,1-di(t-butylperoxy)-3,5,5-trimethylcyclohexane, 1,1-di(t-amylperoxy)cyclohexane, t-butyl-monoperoxy-maleate, 1,1'-azodi(hexahydrobenzonitrile), 1,1'-azobis(cyclohexane-1-cyclonitrile) and 2,2-bis(4,4-di-t-butylperoxycyclohexane)propane). For example, the polymerization initiator may include a low-temperature polymerization initiator which initiates the polymerization at a relatively low temperature and a high-temperature polymerization initiator which initiates the polymerization at a relatively high temperature. In this case, the low-temperature polymerization initiator and the high-temperature polymerization initiator each may be selected from the above-listed polymerization initiators, the polymerization initiator, which initiates the polymerization at a relatively low temperature, of the selected polymerization initiators may be the low-temperature polymerization initiator, and the polymerization initiator, which initiates the polymerization at a relatively high temperature, of the selected polymerization initiators may be the high-temperature polymerization initiator. As a more specific example, the polymerization initiator may be 1,1-bis(t-butylperoxy)cyclohexane and t-butyl peroxybenzoate, and in this case, 1,1-bis(t-butylperoxy)cyclohexane may be a low-temperature polymerization initiator, and t-butyl peroxybenzoate may be a high-temperature polymerization initiator. When the polymerization is initiated by including at least two kinds from the above-listed polymerization initiators, the polymerization reaction temperature is maintained within a proper range, and thus depolymerization which can occur at a high polymerization temperature (e.g., higher than 110° C.) is prevented, and the reduction of the polymerization reactivity which can occur at a low polymerization temperature (e.g., lower than 90° C.) is prevented, so that there is an effect of allowing copolymers to be produced at a high polymerization conversion ratio.

In addition, according to an embodiment of the present invention, the added content of the at least two different kinds of polymerization initiators may be 0.001-1.000 parts by weight, 0.1000-1.000 parts by weight, or 0.500-0.700 parts by weight with respect to 100 parts by weight of the added amount of the total monomers, and there is an effect of allowing copolymers to be produced at a high polymerization conversion ratio within the above range. Here, the added content of the at least two different kinds of polymerization initiators may be the added content of the total polymerization initiators.

Meanwhile, according to an embodiment of the present invention, the added content of each polymerization initiator of the at least two different kinds of polymerization initiators may be 0.001-1.000 parts by weight, 0.010-0.800 parts by weight, or 0.100-0.500 parts by weight with respect to 100 parts by weight of the added amount of the total monomers, and the added content of each polymerization initiator may be selected within the above range of the added content of the total polymerization initiators.

According to an embodiment of the present invention, the polymerization initiator may include a first polymerization initiator and a second polymerization initiator which are different from each other, and the first polymerization initiator and the second polymerization initiator may be added at a weight ratio of 10:1 to 1:10, 10:1 to 1:5 or 5:1 to 1:5. In this case, the first polymerization initiator may be a low-temperature polymerization initiator, the second polymerization initiator may be a high-temperature polymerization initiator, and within the rage of the above weight ratio, there is an effect in that even though the low-temperature polymerization initiator falls short in the later stage (e.g., a time point of 50% to 100% of the polymerization conversion ratio) of the polymerization reaction, the high-temperature polymerization initiator compensates for the insufficient low-temperature polymerization initiator, and thus the polymerization reaction can be maintained while the polymerization reaction rate is not reduced in the later stage of the polymerization reaction.

According to an embodiment of the present invention, the aromatic vinyl-based monomer may be at least one selected from the group consisting of styrene, α-methylstyrene, α-ethylstyrene, p-methylstyrene, o-methylstyrene, o-t-butylstyrene, bromostyrene, chlorostryene, trichlorostyrene, and derivatives thereof.

According to an embodiment of the present invention, the aromatic vinyl-based monomer may include a styrene monomer substituted with an alkyl group. The styrene monomer substituted with an alkyl group may be at least one selected from the group consisting of α-methylstyrene, α-ethylstyrene, p-methylstyrene, o-methylstyrene, and o-t-butylstyrene, and may be a heat-resistant monomer for imparting heat-resistance to a copolymer.

In addition, according to an embodiment of the present invention, the aromatic vinyl-based monomer may include styrene; and at least one selected from the group consisting of α-methylstyrene, α-ethylstyrene, p-methylstyrene, o-methylstyrene, and o-t-butylstyrene.

According to an embodiment of the present invention, part or all of the aromatic vinyl-based monomers may be continuously divisionally added from the time point of the initiation of the polymerization in step (S10) or the time point of 10.00% or more of the total polymerization time during the polymerization in step (S10). As another embodiment, part or all of the aromatic vinyl-based monomers are continuously divisionally added from the time point of the initiation of the polymerization or the time point of 5% or more of the polymerization conversion ratio according to the polymerization in step (S10). Thus, when part or all of the aromatic vinyl-based monomers are continuously divisionally added from the initial stage of the polymerization reaction, there is an effect of improving the uniformity of the monomer units in the produced polymer, thereby improving the thermal stability.

In addition, according to an embodiment of the present invention, part or all of the aromatic vinyl-based monomers may be continuously divisionally added from the time point of the initiation of the polymerization in step (S10) or the time point of 10.00% to 20.00%, or 10.00% to 16.67% of the total polymerization time during the polymerization in step (S10). As another embodiment, part or all of the aromatic vinyl-based monomers are continuously divisionally added from the time point of the initiation of the polymerization or the time point of 5% to 40% or 5% to 31% of the polymerization conversion ratio according to the polymerization in step (S10).

In addition, according to an embodiment of the present invention, as a preferred embodiment, part or all of the aromatic vinyl-based monomers may be continuously divisionally added from the time point of the initiation of the polymerization in step (S10), and in this case, the content of the aromatic vinyl-based monomers, which can participate in the polymerization reaction in the reaction system, can be more easily controlled according to polymerization conversion ratio and polymerization reaction rate, and thus there are effects of reducing the non-uniformity of the monomer units in the produced copolymer and achieving excellent thermal stability.

Here, the time point of the initiation of the polymerization in step (S10) may mean a time point of reaching an initial temperature when elevating a temperature to the polymerization temperature for performing the polymerization reaction in the presence of monomers added before the initiation of the polymerization. In addition, during the elevating of a temperature to the polymerization temperature for performing the polymerization reaction, some polymerization may be performed before reaching the initial temperature, and in this case, the time point of reaching the initial temperature may be a time point at which the polymerization conversion ratio is 5% or less. That is, according to an embodiment of the present invention, part or all of the aromatic vinyl-based monomers may be continuously divisionally added from the time point of reaching the initial temperature in step (S10).

According to an embodiment of the present invention, part or all of the aromatic vinyl-based monomers may be continuously divisionally added to the time point of 70.00% or less of the total polymerization time during the polymerization in step (S10). As another embodiment, part or all of the aromatic vinyl-based monomers may be continuously divisionally added to the time point of 85% or less of the polymerization conversion ratio according to the polymerization in step (S10). When part or all of the aromatic vinyl-based monomers are continuously divisionally added to the time point, the copolymer in the reaction system which is polymerized according to the polymerization conversion ratio and monomers which are continuously divisionally added are smoothly mixed, and thus the production of polymers (e.g., oligomers, single polymers, etc.) different from the copolymer in the reaction system may be prevented. Accordingly, there is an effect of preventing the deterioration of the physical properties and the occurrence of haze which can occur due to the remaining of monomers, which do not participate in the polymerization reaction, and the polymers different from the copolymer in the reaction system.

Further, according to an embodiment of the present invention, part or all of the aromatic vinyl-based monomers may be continuously divisionally added to the time point of 50.00% to 70.00%, or 50.00% to 66.67% of the total polymerization time during the polymerization in step (S10). As another embodiment, part or all of the aromatic vinyl-based monomers are continuously divisionally added to the time point of 71% to 85% of the polymerization conversion ratio according to the polymerization in step (S10).

In addition, according to an embodiment of the present invention, part or all of the aromatic vinyl-based monomers may be continuously divisionally added from the time point of the initiation of the polymerization to the time point of 70.00% or less of the total polymerization time during the polymerization in step (S10), or may be continuously divisionally added from the time point of the initiation of the polymerization to the time point of 85% or less of the polymerization conversion ratio in step (S10).

In addition, according to an embodiment of the present invention, the aromatic vinyl-based monomers may be continuously divisionally added from the time point of the initiation of the polymerization to the time point of 50.00% or less than 66.67% of the total polymerization time during the polymerization in step (S10), or may be continuously divisionally added from the time point of the initiation of the polymerization to the time point of 71% to 85% of the polymerization conversion ratio in step (S10).

Further, according to an embodiment of the present invention, the aromatic vinyl-based monomers may be added in an amount of 50-90 parts by weight, 60-80 parts by weight, or 70-80 parts by weight with respect to 100 parts by weight of the added amount of the total monomers. Here, the added content of the aromatic vinyl-based monomers may be the added content of the aromatic vinyl-based monomers when all of the aromatic vinyl-based monomers are continuously divisionally added during the polymerization in step (S10), or may be the total content of the aromatic vinyl-based monomers, which are collectively added before the initiation of the polymerization in step (S10) when part of the aromatic vinyl-based monomers are continuously divisionally added during the polymerization in step (S10), and the aromatic vinyl-based monomers which are continuously divisionally added during the polymerization in step (S10).

In addition, according to an embodiment of the present invention, 5-30 parts by weight, 10-30 parts by weight, or 15-25 parts by weight of the aromatic vinyl-based monomers with respect to 100 parts by weight of the added amount of the total monomers may be continuously divisionally added during the polymerization in step (S10), and in this case, since the polymerization reaction rate may be maintained at a proper rate by preventing the polymerization reaction rate from increasing sharply, there is an effect of allowing the copolymer to be produced at a high polymerization conversion ratio. Here, the added content of the aromatic vinyl-based monomers may be the content of the aromatic vinyl-based monomers which are continuously divisionally added during the polymerization in step (S10) when part of the aromatic vinyl-based monomers are continuously divisionally added during the polymerization in step (S10).

Further, according to an embodiment of the present invention, part or all of the aromatic vinyl-based monomers may be continuously divisionally added during the polymerization in step (S10) while maintaining a constant rate. Here, the constant rate may mean an addition rate of the aromatic vinyl-based monomers which are continuously divisionally added, and as a specific example, may mean a constant flow rate. That is, according to an embodiment of the present invention, when part or all of the aromatic vinyl-based monomers are continuously divisionally added while maintaining a constant rate, the addition may continue while maintaining a constant flow rate from the start point to the end point when part or all of the aromatic vinyl-based monomers are divisionally added. Thus, in the case where part or all of the aromatic vinyl-based monomers are continuously divisionally added while maintaining a constant rate, the content of the aromatic vinyl-based monomers remaining in the reaction system can be appropriately controlled compared to the case where the monomers are collectively divisionally added in a certain amount at a particular time point, and thereby the difference of the polymerization rate due to the difference of the reactivity between monomers can be minimized. Thus, there are effects of reducing the non-uniformity of the monomer units in the produced copolymer and achieving excellent thermal stability while the polymerization rate is maintained constantly.

According to an embodiment of the present invention, the vinyl cyan-based monomer may be at least one selected from the group consisting of acrylonitrile, methacrylonitrile, ethacrylonitrile, and derivatives thereof, and as a specific example, may be acrylonitrile.

In addition, according to an embodiment of the present invention, the vinyl cyan-based monomer may be added in an amount of 10-50 parts by weight, 20-40 parts by weight, or 20-30 parts by weight with respect to 100 parts by weight of the added amount of the total monomers, and within this range, there are effects in that copolymers can be obtained with a high polymerization conversion ratio, and the copolymers have excellent compatibility with the thermoplastic resin while the mechanical properties of the copolymers are maintained.

Further, according to an embodiment of the present invention, the vinyl cyan-based monomers may be collectively added before the polymerization in step (S10).

Meanwhile, according to an embodiment of the present invention, the method for producing a copolymer may be performed by the suspension polymerization method, and thus may be performed in the presence of at least one additive selected from the group consisting of a water-soluble solvent as a solvent for polymerizing, a molecular weight control agent, and a dispersant.

According to an embodiment of the present invention, the water-soluble solvent may be ion exchange water or deionized water.

In addition, according to an embodiment of the present invention, the molecular weight control agent may be at least one selected from the group consisting of α-methylstyrene dimer, t-dodecyl mercaptan, n-dodecyl mercaptan, octyl mercaptan, carbon tetrachloride, methylene chloride, methylene bromide, tetraethylthiuram disulfide, dipentamethylene thiuram disulfide, and diisopropyl xanthogen disulfide, and as a specific example, may be t-dodecyl mercaptan.

According to an embodiment of the present invention, the molecular weight control agent may be used in an amount of 0.01-0.15 parts by weight, 0.05-0.15 parts by weight, or 0.05-0.10 parts by weight with respect to 100 parts by weight of the added amount of the total monomers, and within this range, copolymers having a proper weight average molecular weight can be produced.

In addition, according to an embodiment of the present invention, the dispersant may be at least one selected from the group consisting of water-soluble polyvinyl alcohol, partially saponified polyvinyl alcohol, polyacrylic acid, a copolymer of vinyl acetate and maleic anhydride, hydroxypropyl methylcellulose, gelatin, calcium phosphate, tricalcium phosphate, hydroxyapatite, sorbitan monolaurate, sorbitan trioleate, polyoxyethylene, sodium lauryl sulfate, sodium dodecylbenzenesulfonate, and sodium dioctylsulfosuccinate, and as a specific example, may be tricalcium phosphate.

According to an embodiment of the present invention, the dispersant may be used in an amount of 0.5-2.0 parts by weight, 0.5-1.5 parts by weight, or 1.0-1.5 parts by weight with respect to 100 parts by weight of the added amount of the total monomers, and within this range, the dispersion stability of the monomers in the polymerization system can increase, thereby producing copolymers having more uniform particles.

In addition, according to an embodiment of the present invention, the method for producing the copolymer may be performed by further including a dispersion adjuvant during the polymerization, and as a specific example, the dispersion adjuvant may be a polyoxyethylene-based dispersion adjuvant, and as a more specific example, may be polyoxyethylene alkyl ether phosphate, and in this case, there is an effect of achieving excellent polymerization stability.

The present invention provides the copolymer which is produced by the method for producing a copolymer. The copolymer may be a styrene-based copolymer, and as a specific example, may be a heat-resistant styrene-based copolymer.

The copolymer according to the present invention is characterized by including an aromatic vinyl-based monomer unit and a vinyl cyan-based monomer unit, wherein a heating residue calculated by Equation 1 below is 97.6% or more.

$$\text{Heating residue (\%)}=(\text{weight of copolymer after staying in oven}/\text{weight of copolymer before staying in oven})\times 100 \quad \text{[Equation 1]}$$

wherein, in Equation 1 above, the staying in the oven is performed at 250° C. for 2 hours.

According to an embodiment of the present invention, the copolymer may have a heating residue calculated by Equation 1 above of 97.6% or more, 97.6% to 100.0%, or 97.6% to 98.1%, and within this range, there is an effect of achieving excellent thermal stability.

According to an embodiment of the present invention, the aromatic vinyl-based monomer unit and the vinyl cyan-based monomer unit each may mean a repeating unit formed by the aromatic vinyl-based monomer and the vinyl cyan-based monomer respectively participating in the polymerization reaction. As a specific example, the polymerization reaction may be a radical polymerization reaction, and thus the monomer unit may mean a repeating unit derived from a carbon-carbon double bond present in the aromatic vinyl-based monomer and the vinyl cyan-based monomer.

According to an embodiment of the present invention, the copolymer may be a random copolymer, and the aromatic vinyl-based monomer unit and the vinyl cyan-based monomer unit may have uniform composition in the copolymer. The uniform composition of the monomer unit may mean that the ratio of each monomer unit present in the polymer growing by being polymerized by the polymerization reaction of monomers is uniformly maintained. As a specific example, as the polymerization proceeds, that is, as the polymerization time changes during the polymerization, when some polymers in the reactor are taken, the ratio of each monomer unit forming the polymer may be uniformly maintained.

The present invention represents the uniformity of composition of the monomer unit as a standard deviation of the content of the vinyl cyan-based monomer unit in the copolymer, which is measured as the polymerization time changes during the polymerization. The standard deviation of the content of the vinyl cyan-based monomer unit in the copolymer, which is measured as the polymerization time changes during the polymerization, can be confirmed from the square root of the value obtained by calculating an average value of the content of the vinyl cyan-based monomer unit in the copolymer which is measured as the polymerization time changes during the polymerization, and calculating an average value of the squared deviations of the calculated average value of the content of the vinyl cyan-based monomer unit. The standard deviation of the content of the vinyl cyan-based monomer unit in the copolymer, which is measured as the polymerization time changes during the polymerization, is small, and this means that the change of the content of the vinyl cyan-based monomer unit in the copolymer for each polymerization time (i.e., for each polymerization conversion ratio) is small, which may mean that the ratio of the copolymer for each polymerization time and each monomer unit of the copolymer in which the polymerization is completed is maintained uniformly.

According to an embodiment of the present invention, the change of the polymerization time may mean a change of time points, which are the time point of the initiation of the polymerization, 60 minutes (1 hour) after the initiation of the polymerization, 120 minutes (2 hours), 240 minutes (4 hours), 480 minutes (8 hours), 600 minutes (10 hours), and 720 minutes (12 hours).

According to an embodiment of the present invention, the copolymer may have a standard deviation of the content of the vinyl cyan-based monomer unit in the copolymer, which is measured as the polymerization time changes during the polymerization, of 0.20 or less, 0.01-0.20, or 0.09-0.17, and within this range, the composition of each monomer unit in the copolymer is uniform, and thus there is an effect of achieving excellent heat-resistance.

The present invention provides a thermoplastic resin composition including the copolymer and a thermoplastic resin. As a specific example, the thermoplastic resin composition may include the copolymer and a diene-based graft copolymer.

In addition, according to an embodiment of the present invention, the diene-based graft copolymer may be an acrylonitrile-butadiene-styrene-based copolymer, and the acrylonitrile-butadiene-styrene-based copolymer serves to provide the thermoplastic resin composition with excellent moldability and impact resistance, and may be a graft copolymer having a core-shell structure including: a core containing a conjugated diene-based monomer unit; and a shell which surrounds the core and contains an aromatic vinyl-based monomer unit and a vinyl cyan-based monomer unit.

According to an embodiment of the present invention, the aromatic vinyl-based monomer of the diene-based graft copolymer may be at least one selected from the group consisting of styrene, α-methylstyrene, α-ethylstyrene, p-methylstyrene, o-methylstyrene, o-t-butylstyrene, bromostyrene, chlorostryene, trichlorostyrene, and derivatives thereof, and as a specific example, may be styrene.

According to an embodiment of the present invention, the vinyl cyan-based monomer of the diene-based graft copolymer may be at least one selected from the group consisting of acrylonitrile, methacrylonitrile, ethacrylonitrile, and derivatives thereof, and as a specific example, may be acrylonitrile.

According to an embodiment of the present invention, the conjugated diene-based monomer of the diene-based graft copolymer may be at least one selected from the group consisting of 1,3-butadiene, 2,3-dimethyl-1,3-butadiene, 2-ethyl-1,3-butadiene, 1,3-pentadiene, and isoprene, and as a specific example, may be 1,3-butadiene.

In addition, according to an embodiment of the present invention, the acrylonitrile-butadiene-styrene-based copolymer may be prepared by the emulsion polymerization and emulsion graft polymerization, and may be prepared, for example, by emulsion polymerizing a conjugated diene-based monomer to prepare a core (or a seed), which is a rubbery polymer, adding a vinyl cyan-based monomer and an aromatic vinyl-based monomer to the core, and performing the emulsion graft polymerization.

In addition, the acrylonitrile-butadiene-styrene-based copolymer may include a core containing a conjugated diene-based monomer-derived unit in an amount of 30 wt % to 70 wt %; and a shell which surrounds the core and includes an aromatic vinyl-based monomer-derived unit and a vinyl cyan-based monomer-derived unit in an amount of 30 wt % to 70 wt %, and the shell may include the aromatic vinyl-based monomer-derived unit and the vinyl cyan-based monomer-derived unit at a weight ratio of 7:3 to 8:2, and in this case, the impact resistance, mechanical properties, and moldability of the copolymer may be more excellent.

Meanwhile, the thermoplastic resin composition according to an embodiment of the present invention may further include at least one additive selected from the group consisting of an impact modifier, a lubricant, a heat stabilizer, an anti-drip agent, an antioxidant, a light stabilizer, a UV blocking agent, a pigment, and an inorganic filler as necessary. And in this case, the additives may be used in an amount of 5.0 parts by weight or less, or 0.1-1.0 parts by weight with respect to 100 parts by weight of the copolymer and the thermoplastic resin.

In addition, the specific material of the additive may be used without particular limitation as long as it is used in the thermoplastic resin composition, but for example, as the anti-drip agent, at least one selected from the group consisting of teflon, polyamide, polysilicon, polytetrafluoroethylene (PTFE) and tetrafluoroethylene-hexafluoropropylene (TFE-HFP) copolymer may be used for further improving flame retardancy, and as the inorganic filler, at least one selected from the group consisting of barium sulfate, barium glass filler, and barium oxide may be used.

Hereinafter, examples of the present invention will be described in detail so that a person with ordinary skill in the art can easily carry out the present invention. The present invention may, however, be embodied in different forms and should not be construed as limited to the examples set forth herein.

EXAMPLES

Example 1

To a reactor, 114 parts by weight of ion exchange water, 48 parts by weight of α-methylstyrene, 32 parts by weight of acrylonitrile, 0.5 parts by weight of 1,1-bis(t-butylperoxy) cyclohexane as a first polymerization initiator, 0.1 parts by weight of t-butyl peroxybenzoate as a second polymerization initiator, 0.005 parts by weight of polyoxyethylene alkyl ether phosphate, and 1.3 parts by weight of tricalcium phosphate were added and polymerization was initiated at 100° C. After two hours from the initiation of the polymerization (31% of polymerization conversion ratio), 20 parts by weight of α-methylstyrene was continuously added for 6 hours while maintaining a rate of 3.33 parts by weight/hr. After the addition of α-methylstyrene was completed (85% of polymerization conversion ratio), the polymerization further proceeded for 4 hours, formic acid was added thereto so that the pH of a polymer slurry became 2.5, and then the polymer slurry was rinsed, dehydrated, and dried to produce a copolymer in a form of powder.

Here, the parts by weight were parts by weight with respect to 100 parts by weight of the added amount of the total monomers.

Example 2

Example 2 was performed in the same manner as Example except that in Example 1, 20 parts by weight of α-methylstyrene was continuously added for 8 hours while maintaining a rate of 2.50 parts by weight/hr when the polymerization was initiated. Here, the polymerization conversion ratio was 85% when the addition of α-methylstyrene was completed.

Example 3

Example 3 was performed in the same manner as Example except that in Example 1, 20 parts by weight of α-methylstyrene was continuously added for 6 hours while maintaining a rate of 3.33 parts by weight/hr when the polymerization was initiated, and after the addition of α-methylstyrene was completed (71% of polymerization conversion ratio), the polymerization further proceeded for 6 hours.

Comparative Example 1

To a reactor, 114 parts by weight of ion exchange water, 68 parts by weight of α-methylstyrene, 32 parts by weight of acrylonitrile, 0.2 parts by weight of 2,2-bis(4,4-di-t-butylperoxy cyclohexane)propane as a polymerization initiator, 0.005 parts by weight of polyoxyethylene alkyl ether phosphate, and 1.3 parts by weight of tricalcium phosphate were added and the polymerization was initiated at 100° C. The polymerization reaction was performed for 12 hours, formic acid was added thereto so that the pH of a polymer slurry became 2.5, and then the polymer slurry was rinsed, dehydrated, and dried to produce a copolymer in a form of powder.

Here, the parts by weight were parts by weight with respect to 100 parts by weight of the added amount of the total monomers.

Comparative Example 2

Comparative Example 2 was performed in the same manner as Comparative Example 1 except that in Comparative Example 1, 0.4 parts by weight of 2,2-bis(4,4-di-t-butylperoxy cyclohexane)propane was added instead of 0.2 parts by weight.

Comparative Example 3

Comparative Example 3 was performed in the same manner as Comparative Example 1 except that in Comparative Example 1, 0.6 parts by weight of 2,2-bis(4,4-di-t-butylperoxy cyclohexane)propane was added in stead of 0.2 parts by weight.

Comparative Example 4

Comparative Example 4 was performed in the same manner as Comparative Example 1 except that in Comparative Example 1, the polymerization was initiated at 105° C.

Comparative Example 5

Comparative Example 5 was performed in the same manner as Comparative Example 4 except that in Comparative Example 4, 0.4 parts by weight of 2,2-bis(4,4-di-t-butylperoxy cyclohexane)propane was added instead of 0.2 parts by weight.

Comparative Example 6

Comparative Example 6 was performed in the same manner as Comparative Example 4 except that in Comparative Example 4, 0.6 parts by weight of 2,2-bis(4,4-di-t-butylperoxy cyclohexane)propane was added in stead of 0.2 parts by weight.

Comparative Example 7

Comparative Example 7 was performed in the same manner as Comparative Example 1 except that in Comparative Example 1, 0.6 parts by weight of 1,1-bis(t-butylperoxy)cyclohexane was added instead of 0.2 parts by weight of 2,2-bis(4,4-di-t-butylperoxy cyclohexane)propane.

Comparative Example 8

Comparative Example 8 was performed in the same manner as Example 1 except that in Example 1, 0.6 parts by weight of 1,1-bis(t-butylperoxy)cyclohexane was added instead of 0.5 parts by weight of 1,1-bis(t-butylperoxy) cyclohexane and 0.1 parts by weight of t-butyl peroxybenzoate.

Here, the polymerization conversion ratio was 36% after two hours from the initiation of the polymerization, and the polymerization conversion ratio was 85% when the addition of α-methylstyrene was completed.

Comparative Example 9

Comparative Example 9 was performed in the same manner as Example 1 except that in Example 1, 0.6 parts by weight of 1,1-bis(t-butylperoxy)cyclohexane was added instead of 0.5 parts by weight of 1,1-bis(t-butylperoxy) cyclohexane and 0.1 parts by weight of t-butyl peroxybenzoate, 20 parts by weight of α-methylstyrene was continuously added for 6 hours while maintaining a rate of 3.33 parts by weight/hr when the polymerization was initiated, and after the addition of α-methylstyrene was completed (71% of polymerization conversion ratio), the polymerization further proceeded for 6 hours.

Comparative Example 10

Comparative Example 10 was performed in the same manner as Example 2 except that in Example 2, 0.6 parts by weight of 1,1-bis(t-butylperoxy)cyclohexane was added instead of 0.5 parts by weight of 1,1-bis(t-butylperoxy) cyclohexane and 0.1 parts by weight of t-butyl peroxybenzoate.

Here, the polymerization conversion ratio was 85% when the addition of α-methylstyrene was completed.

Comparative Example 11

Comparative Example 11 was performed in the same manner as Comparative Example 1 except that in Comparative Example 1, 0.5 parts by weight of 1,1-bis(t-butylperoxy)cyclohexane as a first polymerization initiator was added instead of 0.2 parts by weight of 2,2-bis(4,4-di-t-butylperoxy cyclohexane)propane as a polymerization initiator.

Experimental Examples

With respect to the copolymers produced in Examples 1 to 3 and Comparative Examples 1 to 11, heating residues were measured as follows, and the results are shown in Table 1 and 2.

In addition, when the copolymers of Examples 1 to 3 and Comparative Examples 1 to 11 were produced, the content of the vinyl cyan-based monomer unit in each copolymer was measured by the method below from the copolymers at the time points which are the polymerization initiation time point, 60 minutes (1 hour) after the initiation of the polymerization, 120 minutes (2 hours), 240 minutes (4 hours), 480 minutes (8 hours), 600 minutes (10 hours), and the copolymer produced at 720 minutes (12 hours) after the initiation of the polymerization, and the standard deviation (AN standard deviation) of this was calculated, and the results are shown in Table 1 and 2.

1) Heating residue (%): 4 g of copolymers was added in an oven, stayed at 250° C. for 2 hours, and then the heating residue was calculated by using Equation 1 below:

Heating residue (%)=(weight of copolymer after staying in oven/weight of copolymer before staying in oven)×100 [Equation 1]

2) Content of vinyl cyan-based monomer unit in copolymer (wt %): after 0.02 g of a sample was taken from the copolymers at the time points which are the polymerization initiation time point, 60 minutes (1 hour) after the initiation of the polymerization, 120 minutes (2 hours), 240 minutes (4 hours), 480 minutes (8 hours), 600 minutes (10 hours), and 720 minutes (12 hours), a specimen in the form of film was prepared at 220° C. by using Universal Film Maker, and the content of the vinyl cyan-based monomer unit in the copolymer was measured by Fourier-transform infrared spectroscopy (FT-IR).

TABLE 1

| Division | | | Examples 1 | 2 | 3 |
|---|---|---|---|---|---|
| Initiators | Type | | A[1)]/B[2)] | A[1)]/B[2)] | A[1)]/B[2)] |
| | Added content | (Parts by weight) | 0.5/0.1 | 0.5/0.1 | 0.5/0.1 |
| Divisional addition | Monomer content | (Parts by weight) | 20 | 20 | 20 |
| | Total time | (Hours) | 6 | 8 | 6 |
| | Start time | (Hours) | 2 | 0 | 0 |
| | Start polymerization conversion ratio | (%) | 31 | 0 | 0 |
| | End time | (Hours) | 8 | 8 | 6 |
| | End polymerization conversion ratio | (%) | 85 | 85 | 71 |
| | Addition rate | (Parts by weight/hr) | 3.33 | 2.50 | 3.33 |
| Polymerization temperature | | (° C.) | 100 | 100 | 100 |
| Total polymerization time | | (Hours) | 12 | 12 | 12 |
| Heating residue | | (%) | 97.6 | 98.1 | 98.0 |
| AN standard deviation | | | 0.15 | 0.09 | 0.17 |

[1)]A: 1,1-bis(t-butylperoxy)cyclohexane
[2)]B: t-butyl peroxybenzoate

TABLE 2

| Division | | | Comparative examples 1 | 2 | 3 | 4 | 5 | 6 | 7 | 8 | 9 | 10 | 11 |
|---|---|---|---|---|---|---|---|---|---|---|---|---|---|
| Initiators | Type | | C3) | C[3)] | C[3)] | C[3)] | C[3)] | C[3)] | A[1)] | A[1)] | A[1)] | A[1)] | A[1)]/B[2)] |
| | Added content | (Parts by weight) | 0.2 | 0.4 | 0.6 | 0.2 | 0.4 | 0.6 | 0.6 | 0.6 | 0.6 | 0.6 | 0.5/0.1 |
| Divisional addition | Monomer content | (Parts by weight) | 0 | 0 | 0 | 0 | 0 | 0 | 0 | 20 | 20 | 20 | 0 |
| | Total time | (Hours) | — | — | — | — | — | — | — | 6 | 6 | 8 | — |
| | Start time | (Hours) | — | — | — | — | — | — | — | 2 | 0 | 0 | — |
| | Start polymerization conversion ratio | (%) | — | — | — | — | — | — | — | 36 | 0 | 0 | — |

TABLE 2-continued

| Division | | Comparative examples 1 | 2 | 3 | 4 | 5 | 6 | 7 | 8 | 9 | 10 | 11 |
|---|---|---|---|---|---|---|---|---|---|---|---|---|
| End time | (Hours) | — | — | — | — | — | — | — | 8 | 6 | 8 | — |
| End polymerization conversion ratio | (%) | — | — | — | — | — | — | — | 85 | 71 | 85 | — |
| Addition rate | (Parts by weight/hr) | — | — | — | — | — | — | — | 3.33 | 3.33 | 2.50 | — |
| Polymerization temperature | (° C.) | 100 | 100 | 100 | 105 | 105 | 105 | 100 | 100 | 100 | 100 | 100 |
| Total polymerization time | (Hours) | 12 | 12 | 12 | 12 | 12 | 12 | 12 | 12 | 12 | 12 | 12 |
| Heating residue | (%) | 87.4 | 91.5 | 97.9 | 91.3 | 95.2 | 98.0 | 94.8 | 93.7 | 97.8 | 97.7 | 97.9 |
| AN standard deviation | | 0.42 | 0.87 | 0.92 | 0.47 | 0.90 | 0.99 | 0.71 | 0.30 | 0.33 | 0.27 | 1.10 |

1)A: 1,1-bis(t-butylperoxy)cyclohexane

2)B: t-butyl peroxybenzoate

3)C: 2,2-bis(4,4-di-t-butylperoxy cyclohexane)propane

As may be confirmed in Tables 1 and 2 above, it may be confirmed that the copolymers of Examples 1 to 3 produced according to the method for producing a copolymer of the present invention have excellent heat-resistance because the heating residue was maintained highly after the copolymers stayed in the oven, and show a very low standard deviation of the content of the vinyl cyan-based monomer unit in the copolymer, the content being measured as the polymerization time changes during the polymerization, and thus the monomer unit in the copolymer is uniform.

On the other hand, it may be confirmed that Comparative Example 1, in which only one kind of polymerization initiator was used and all of the aromatic vinyl-based monomers were collectively added before the initiation of the polymerization when producing the copolymer, has poor heat-resistance due to a low heating residue.

In addition, it may be confirmed that in order to improve heat-resistance compared to Comparative Example 1, Comparative Examples 2 and 3, in which only the added content of the polymerization initiator was increased unlike the present invention, also have increased standard deviation of the content of the vinyl cyan-based monomer unit in the copolymer, and thus the non-uniformity of the monomer unit in the copolymer increases.

In addition, it may be confirmed that in order to improve heat-resistance compared to Comparative Examples 1 to 3, Comparative Examples 4 and 6, in which the polymerization temperature was increased unlike the present invention, also have increased standard deviation of the content of the vinyl cyan-based monomer unit in the copolymer, and thus the non-uniformity of the monomer unit in the copolymer increases.

In addition, it may be confirmed that in order to improve heat-resistance compared to Comparative Example 1, Comparative Example 7, in which the kind of the polymerization initiator was changed and the added content thereof was increased unlike the present invention, also has increased standard deviation of the content of the vinyl cyan-based monomer unit in the copolymer, and thus the non-uniformity of the monomer unit in the copolymer increases.

Moreover, it may be confirmed that even though part of the aromatic vinyl-based monomers were continuously divisionally added during the polymerization when producing the copolymer, Comparative Examples 8 to 10 using only one kind of polymerization initiator show a high standard deviation of the content of the vinyl cyan-based monomer unit in the copolymer, and thus the effect of improving the non-uniformity of the monomer unit in the copolymer is slight.

It is construed that this is because when only one kind of polymerization initiator is used, the polymerization initiator remaining in the reaction system falls short at the later stage of the polymerization reaction, and thus the polymerization reaction rate is reduced.

In addition, even though only two kinds of polymerization initiators are used when producing the copolymer, Comparative Example 11, in which all of the aromatic vinyl-based monomers are collectively added before the initiation of the polymerization also show a high standard deviation of the content of the vinyl cyan-based monomer unit in the copolymer, and thus the non-uniformity of the monomer unit in the copolymer increases sharply.

It is construed that this is because the vinyl cyan-based monomers are dissolved in ion exchange water which is a water-soluble solvent, and thus the aromatic vinyl-based monomers and only some vinyl cyan-based monomers participate in the polymerization reaction at the initial stage of the polymerization, and as the polymerization goes to the later stage, only the vinyl cyan-based monomers remain to continue with the polymerization reaction.

As a result, it may be confirmed that when at least two kinds of polymerization initiators are used as a polymerization initiator and part or all of the aromatic vinyl-based monomers are continuously divisionally added during the polymerization to produce a copolymer according to the method for producing a copolymer of the present invention, the non-uniformity of the monomer unit in the copolymer is reduced and simultaneously, the heat-resistant styrene-based copolymer having excellent thermal stability can be produced.

The invention claimed is:

1. A method for producing a copolymer comprising step (S10) for adding aromatic vinyl-based monomers and vinyl cyan-based monomers to perform polymerization in the presence of polymerization initiators, wherein the polymerization initiators comprise at least two different kinds of polymerization initiators, and part of the aromatic vinyl-based monomers are continuously divisionally added while maintaining a constant rate during the polymerization in step (S10), wherein all the vinyl cyan-based monomers are added before the polymerization in step (S10), wherein the aromatic vinyl-based monomer comprises a styrene monomer substituted with an alkyl group, and wherein the polymerization initiators comprise t-butyl peroxybenzoate and at least one selected from the group consisting of 2,5-dimethyl-2,5-di(t-butylperoxy) hexane, di(t-butylperoxy-isopropyl)benzene, t-butyl cumyl peroxide, di-(t-amyl)-peroxide, dicumyl peroxide, butyl 4,4-di(t-butylperoxy)valerate, 2,2-di(t-butylperoxy)butane, t-amyl peroxy-benzoate, t-butylperoxy-acetate, t-butylperoxy-(2-ethylhexyl) carbonate, t-butylperoxy isopropyl carbonate, t-butyl peroxy-3,5,5-trimethyl-hexanoate, 1,1-bis(t-butylperoxy)cyclohexane, t-amyl peroxyacetate, t-amylperoxy-(2-ethylhexyl)carbonate, 1,1-di(t-butylperoxy)-3,5,5-trimethylcyclohexane, 1,1-di(t-amylperoxy) cyclohexane, t-butyl-monoperoxy-maleate and 2,2-bis (4,4-di-t-butylperoxycyclohexane)propane).

2. The method of claim 1, wherein the added content of the at least two different kinds of polymerization initiators is 0.001-1.000 parts by weight with respect to 100 parts by weight of the added amount of the total monomers.

3. The method of claim 1, wherein the polymerization initiators comprise a first polymerization initiator and a second polymerization initiator which are different, and the first polymerization initiator and the second polymerization initiator are added at a weight ratio of 10:1 to 1:10.

4. The method of claim 1, wherein part of the aromatic vinyl-based monomers are continuously divisionally added from the time point of the initiation of the polymerization in step (S10).

5. The method of claim 1, wherein part of the aromatic vinyl-based monomers are continuously divisionally added to the time point of 70.00% or less of the total polymerization time during the polymerization in step (S10).

6. The method of claim 1, wherein 5-30 parts by weight of the aromatic vinyl-based monomers with respect to 100 parts by weight of the added amount of the total monomers are continuously divisionally added during the polymerization in step (S10).

* * * * *